United States Patent [19]

Munoz et al.

[11] Patent Number: 5,141,214

[45] Date of Patent: Aug. 25, 1992

[54] APPARATUS FOR EXERTING A SPRING LOADED FORCE

[75] Inventors: David Munoz, Los Angeles; Scott Mauro, Glendale, both of Calif.

[73] Assignee: Applied Power, Inc., Butler, Wis.

[21] Appl. No.: 772,722

[22] Filed: Oct. 7, 1991

[51] Int. Cl.$^5$ .............................................. B23Q 3/00
[52] U.S. Cl. .............................................. 269/254 CS
[58] Field of Search .................. 269/254 CS, 70, 217, 269/317; 29/275

[56] References Cited

U.S. PATENT DOCUMENTS

| | | | |
|---|---|---|---|
| 3,056,609 | 10/1962 | Buck | 269/254 CS |
| 3,088,729 | 5/1963 | Marcus | 269/254 CS |
| 3,209,445 | 10/1965 | Moskovitz | 29/275 |
| 3,339,262 | 9/1967 | Brinson | 29/275 |
| 4,821,393 | 4/1989 | Spigarelli | 269/254 CS |
| 5,020,205 | 6/1991 | Wridt | 29/275 |

Primary Examiner—Robert C. Watson
Attorney, Agent, or Firm—Quarles & Brady

[57] ABSTRACT

In a plunger apparatus for exerting a spring-loaded force on a work piece, a plug, whose depth of insertion determines the amount of the force exerted by the spring, is pressed into the body of the apparatus and, by the friction between the plug and the inner surface of the body, is held immobile to torque applied to the plug in installing and removing the apparatus from a machine and to forces experienced in operations.

4 Claims, 1 Drawing Sheet

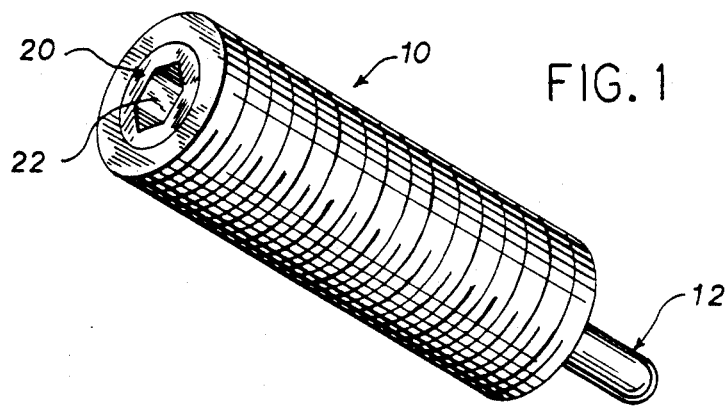
FIG. 1
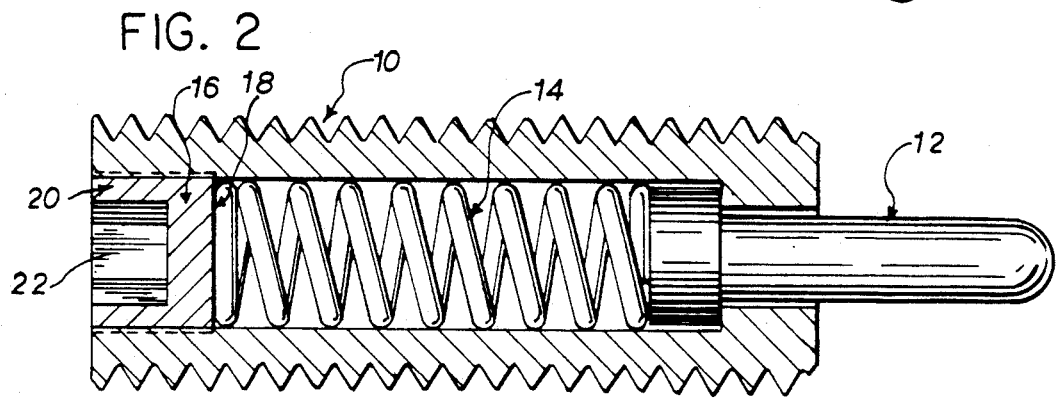
FIG. 2
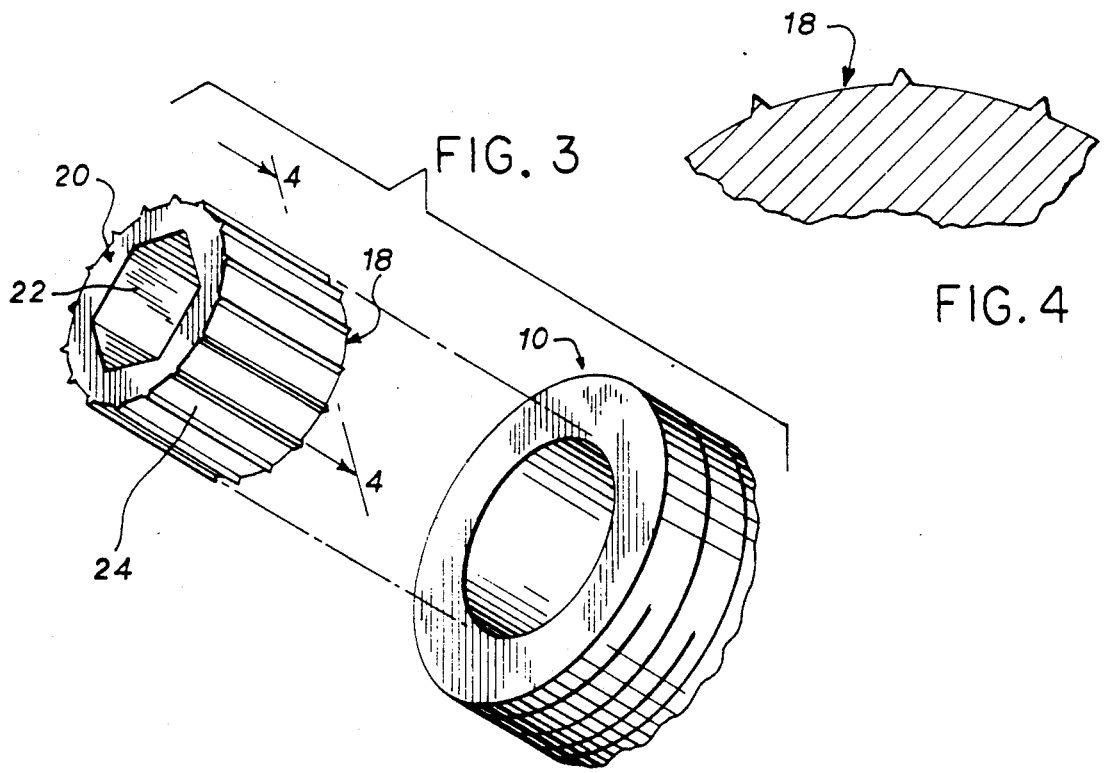
FIG. 3
FIG. 4

APPARATUS FOR EXERTING A SPRING LOADED FORCE

BACKGROUND OF THE INVENTION

The invention relates to an apparatus for exerting a spring loaded force on a part such as a workpiece, another component of a machine or other article.

Spring loaded plunger assemblies are used in many manufacturing applications and as components of manufactured products. In manufacturing, they may hold materials in place for tooling and assembly processes, and they perform detent, indexing, positioning and ejection functions as well. In products they perform many similar functions, especially indexing and positioning. In some situations, the amount of force transmitted by the spring to the plunger and must be set precisely for a particular application. That force is determined by the extent to which the spring is compressed when the plunger is not depressed, which is determined by the depth to which a plug (the "force-setting plug") is inserted into the body of the plunger assembly.

Typically, the outside of the body of the plunger assembly is threaded so that the assembly can be screwed into a threaded hole on a machine tool or other device. In some applications, it is necessary or preferable to install and disinstall the assembly by using a screw driver or wrench to apply torque to the force-setting plug, thereby rotating the entire assembly.

Heretofore, a threaded set screw has been used as the force-setting plug. The set screw is screwed into the body of the assembly to the depth needed to produce the desired amount of force to be exerted by the plunger. The set screw may be cemented or otherwise locked into place to attempt to immobilize it against the torque applied in installing and disinstalling the assembly and against vibrations incurred during operations.

It is found in practice that the set screw may loosen, especially when torque is applied to it in order to disinstall the plunger assembly. This may cause significant difficulty and delay in disinstalling the assembly. The set screw may also loosen during installation or during operations. Besides loosening, another disadvantage of using a set screw as the force-setting plug is the cost of threading both it and the rear inner surface of the body of the assembly.

SUMMARY OF THE INVENTION

The invention provides an apparatus for applying a desired amount of spring loaded force onto a part by means of a spring loaded plunger assembly into which a plug is pressed to the depth which will produce the force needed for a particular application. The plug is held immobile by friction between the outer surface of the plug and the inner surface of the body of the assembly and remains immobile during machine operations and despite the application of torque to the plug during installation and disinstallation of the assembly.

The objects of the invention are to:
(a) Improve the installation, operational reliability and disinstallation of spring loaded plunger assemblies; and
(b) Reduce the cost of manufacturing such assemblies.

These and other objects and advantages of the invention will be apparent from the description which follows. The preferred embodiment of the invention will be described in reference to the accompanying drawings. This embodiment does not represent the full scope of the invention, but rather the invention may be employed in other embodiments. Reference should therefore be made to the claims herein for interpreting the breadth of the invention.

DESCRIPTION OF THE DRAWINGS

FIG. 1 is a view in perspective of a threaded spring loaded plunger assembly.

FIG. 2 is a longitudinal cross sectional view of the plunger assembly shown in FIG. 1.

FIG. 3 is an exploded perspective view showing the rounded surface of the plug, its outer face which is provided with a socket to accommodate a tool and the end of the assembly body into which it is pressed.

FIG. 4 is a partial cross sectional view of the plug along line 4-4 of FIG. 3.

DETAILED DESCRIPTION OF THE PREFERRED EMBODIMENT

FIG. 1 shows a threaded body 10 of the plunger assembly, from one end of which extends a plunger 12. As shown in FIG. 2, the plunger 12 is captured within the body 10 and abuts a helical spring 14. The end of the spring 14 opposite the plunger 12 abuts a plug 16. The depth of the insertion of the plug 16 into the body determines force exerted on the plunger 12 by the spring 14.

The plug 16 has a flat face 18 which abuts the spring 14 and a face 20 in which there is a socket 22 which will accommodate a hex wrench. The curved surface 24 of the plug 16 is knurled by a series of parallel ridges and grooves which run longitudinally. The plug 16 is press fitted into the body 10. The ridge-to-ridge outer diameter of surface 24 is slightly greater than the inner diameter of the body 10. The knurling may be produced by a knurling tool on a lathe or any other method which will produce the required ridges and grooves.

In practice, the assembly is calibrated to establish a relationship between the depth to which the plug 16 is inserted into the body 10 and the initial force exerted on the plunger 12 by the spring 14. A particular application requires a certain initial force. Plug 16 is inserted precisely to the depth that will provide that force. As shown in FIG. 2, the depth of insertion is equal to the length of the plug so that inserting the plug until flush with the end of the body 10 will achieve the required force. Alternatively, the required depth of insertion could be marked on the surface of plug 16, which would then be inserted until that mark was aligned with the end of body 10.

The body 10 is then threaded into a threaded hole on the machine or other device, using a hex wrench at socket 22 to apply a torque to the entire assembly. In order to disinstall the assembly from the machine, a hex wrench is applied to socket 22 to apply torque in the opposite direction. Because of the design of the plug 16, the torque needed to install and disinstall the assembly is insufficient to move the plug 16 in relation to the body 10.

From the description above, it is apparent that the present invention facilitates the installation, operation and disinstallation of spring loaded plunger devices. The invention also reduces the costs of manufacturing the spring loaded plunger assembly.

The device can be manufactured out of conventional materials. Typically, steel is used because of its durability, but other materials may be satisfactory as well.

The invention is not intended to be limited by the foregoing description or the drawings of the preferred embodiment, but only by the claims which follow.

We claim:

1. An apparatus for exerting a spring-loaded force on an article, comprising:
   a. a hollow body;
   b. a helical spring located longitudinally in the body;
   c. a movable plunger one end of which extend beyond the body and the other end of which is captured within the body and abuts against the spring; and
   d. a plug which is inserted into the other end of the body to abut the other end of the spring the surface of which plug is roughened, gouged, scored or otherwise modulated, and which is plug held in place by friction between the modulated plug surface and the interior surface of the body.

2. The apparatus for exerting a spring-loaded force on an article according to claim 1 in which the surface of the plug which engages the interior surface of the body is knurled.

3. The apparatus for exerting a spring-loaded force on an article according to claim 1 or 2 in which the exterior of the body is threaded for mating to a threaded hole and the plug has a socket at one end to accommodate a tool for rotating the apparatus for the purpose of mounting the apparatus into, and removing it from, the threaded hole.

4. An improved plunger apparatus of the type in which a helical spring housed in a hollow body exerts force at one end on a movable plunger and at its other end on a plug, the amount of the force exerted on the movable member being determined by the depth to which the plug is inserted into the body, wherein the improvement comprises a plug which is held in place by an interference fit between the plug's surface and the interior surface of the body.

* * * * *